Aug. 24, 1965 G. K. HOUPT 3,202,923
BIDIRECTIONAL CURRENT AMPLIFIER AND DEMODULATOR
Filed Sept. 5, 1961
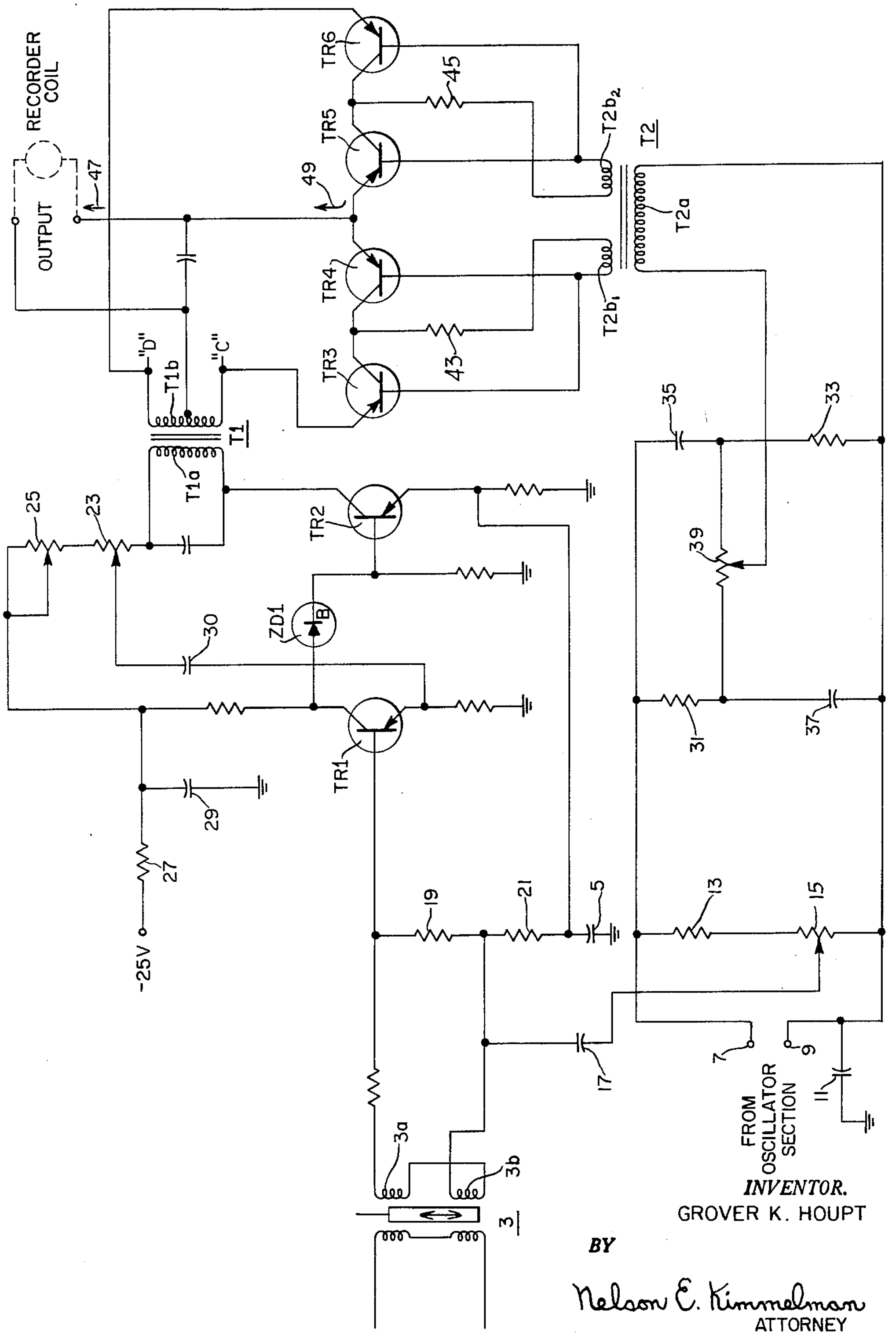
*INVENTOR.*
GROVER K. HOUPT
*BY*
Nelson E. Kimmelman
ATTORNEY United States Patent Office 3,202,923

Patented Aug. 24, 1965

3,202,923

BIDIRECTIONAL CURRENT AMPLIFIER AND DEMODULATOR

Grover K. Houpt, Lansdale, Pa., assignor to Automatic Timing & Controls, Inc., King of Prussia, Pa., a corporation of Pennsylvania Filed Sept. 5, 1961, Ser. No. 136,024
8 Claims. (Cl. 330—10)

This invention relates to demodulator circuits and in particular to a novel demodulator circuit capable of producing direct currents of either polarity for driving high-current utilization circuits.

For many industrial and laboratory applications devices are used which require relatively high current input and are characterized by high impedance inputs. Such devices include certain types of relays, hydraulic servo valves, and direct-writing (galvanometer type) recorders such as those produced and sold by Texas Instruments, Incorporated and the Esterline-Angus Corporation. One such application involves converting the A.C. output voltage of a differential transformer to a direct current having an amplitude sufficient to drive a recorder of the type mentioned above. To insure accurate recording the current applied to the recorder should be proportional to the A.C. voltage at the output of the differential transformer regardless of variations in the impedance of the recorder.

In the prior art, amplifier-demodulators were known to which the output of the differential transformer was applied. The D.C. voltage output of the demodulator, in turn, was applied to the base of a transistor whose collector, for example, was in series with the coil in the direct-writing recorder. This arrangement attempts to use a transistor to simulate a constant current source, but its effectiveness depends upon the characteristics of the transistor and lacks certain positive attributes which my invention possesses.

It is also desired when such demodulator circuits are employed with differential transformers, for example, for the output current of the demodulator to reverse polarity as the armature of the differential transformer goes through the "null point." In addition, it is useful and desirable that the output of the demodulator be isolated from the differential transformer output, or from the local oscillator subassembly, or from other parts of the associated circuits.

It is therefore a primary object of the invention to produce a novel demodulator capable of producing relatively high direct currents which are proportional to the amplitude of an input A.C. voltage.

Still another object of the invention is to provide a novel demodulator circuit for converting A.C. voltages to proportional direct currents of relatively large amplitudes for directly driving high current devices.

Still another object of the invention is to provide a novel demodulator having high impedance output for use in driving high current devices having high impedance inputs.

Another aim of the invention is to provide a novel demodulator circuit whose direct current output reverses polarity when the voltage input does.

Yet another object of the invention is to provide a novel demodulator circuit whose output is effectively isolated from any other part of the preceding or associated circuits.

Still other objects of the invention will be appreciated by those skilled in the art upon perusal of the drawing, specification and claims herein.

Referring to the sole figure, the output A.C. signal, say at 1600 c.p.s., of a differential transformer 3 appearing across the output windings 3*a* and 3*b* is applied to the input of a transistor TR1 between the base and ground. Transistor TR1, as well as all other transistors in the circuit, may be type 2N1381. A signal having the same frequency as said input signal but having a reference phase is applied from an external source (not shown) to input terminals 7 and 9. The terminal 9 is coupled via a capacitor 11 to ground. Across the terminals 7 and 9 are a resistor 13 and a potentiometer 15. The movable arm of the potentiometer 15 is coupled, via capacitor 17, to one terminal of the secondary differential transformer winding 3*b*. The reference phase signal is therefore applied, together with the differential transformer output signal, to the base of transistor TR1. Movement of the arm of potentiometer enables adjustment of the effective "null point" of the differential transformer to be made. When the potentiometer arm is at the junction of the potentiometer 15 and the capacitor 11, it is effectively at the A.C. ground potential.

The transistor TR1 is directly coupled via a Zener diode ZD1 (for bias control) to the base of a second transistor TR2. The four unnumbered resistors in the amplifier are for bias control. Capacitor 5 is used as a by-pass capacitor to increase gain at the signal frequency. Resistors 18 and 19 are (sometimes) used to attenuate the output signal of transformer 3. The output of transistor TR2 is passed through the primary winding T1*a* of the transformer T1. In series with the winding T1*a* are the potentiometer 23 and the potentiometer 25 which act as range adjustment elements. All output current passes through potentiometers 23 and 25. The coupling for capacitor 29 to the junction of resistor 27 and potentiometer 25 by-passes A.C. to ground permitting bias current to flow from the —25 v. source to transistors TR1 and TR2.

Since the A.C. potential at the arm of potentiometer 23 is coupled via capacitor 30 to the emitter of TR1 and since this A.C. potential is negative feedback with respect to the signal on base of TR1, the setting of the arm determines the gain or sensitivity of the amplifier section.

The reference phase signal is also applied to what may be regarded as a phase adjusting network. The terminals 7 and 9 are coupled to a phase compensation circuit comprising resistances 31 and 33 and capacitors 35 and 37 with a potentiometer 39 located as shown. The movable arm of potentiometer 39 is in series with the primary winding T2*a* of the transformer T2. The secondary windings $T2b_1$ and $T2b_2$ are connected to the junctions of transistors TR3, TR4, and TR5, TR6 respectively through resistance elements 43 and 45. The bases of the transistors in each pair TR3, TR4, TR5, and TR6 are used with the "inverted connection" configuration, that is the input signal is applied between base and collector electrodes rather than between base and emitter electrodes as is more customary. This results in a better switching action, particularly in the "closed" or "on" state, because of the resulting lower voltage drop from the collector to the emitter.

The secondary windings $T2b_1$ and $T2b_2$ are so arranged with respect to the primary winding that when the bases of the transistors TR3 and TR4 are negative, the bases of the transistors TR5 and TR6 are positive and vice versa. In the former case, TR3 and TR4 will conduct in series so that when "C" is positive, current will flow through the load in the direction shown by the arrow 47. In the next adjacent cycle "C" will be negative and "D" will be positive whereas the bases of transistors TR3 and TR4 will be positive and those of TR5 and TR6 will be negative. Since the bases of TR5 and TR6 are negative whereas the collectors thereof are positive, current will flow through transistors TR5 and TR6 in the direction of the arrow 49 which, it will be observed, points in the same direction as the arrow 47. Consequently, a full-wave demodulator current passes through the D.C. output load.

Any changes in the current in the load circuit will affect the current in the primary winding circuit of transformer T1. Transformer T1, which may be a Stancor type TA–27, for example, is chosen or constructed so that there will be maximum reflection of the current changes in the secondary winding T1*b* to the primary winding T1*a* so that the current in the load, be it a direct galvanometer-type recording instrument, relay or other utilization device, is reflected to the primary winding. Therefore, should the current in the load circuit increase, the current in the primary (T1*a*) circuit will increase so that the negative feedback voltage at the arm of potentiometer 23 will increase until the signal between the emitter of TR1 and ground will practically equal the signal between its base and ground (and have the same polarity) and only the difference will be amplified. Thus, since the signals on the base and emitter are approximately the same, the D.-C. output (load) signal will be proportional to the A.C. input signal applied to the TR1. This enables the current output of the demodulator section to be practically independent of the resistance of the load utilization circuit which is the desired operating condition. In addition, since the negative feedback is applied to the emitter of TR1, the impedance seen from the output of the differential transformer is raised and therefore the secondary of the latter is not unduly loaded. Consequently, greater output and freedom from temperature effects may be obtained by using my invention rather than other circuits designed for similar purposes.

While the invention has been described in terms of an amplifier-demodulator for coupling the output of a differential transformer to a galvanometer-type recorder, it will be apparent that many other applications are possible without departing from the essence thereof. Consequently, the scope of this invention is to be limited only by the claims herein.

I claim:

1. In combination:

(a) A.C. amplifying means having an input to which an input signal of a predetermined frequency and varying phase is to be applied, (b) a transformer coupled to said amplifying means, said transformer having a primary winding which is arranged to be traversed by the output current of said A.C. amplifying means, (c) means coupled between the input of said amplifying means and said primary winding for developing an A.C. voltage proportional to said output current and for applying said A.C. voltage as a negative feedback signal to said input, and (d) A.C. demodulating means coupled to the secondary winding of said transformer, said secondary winding being coupled to output terminals for connection to a utilization circuit, said demodulating means including a source of a signal having the same frequency as said input signal but having a fixed reference phase, said demodulating means also being coupled to said output terminals, said combination operating such that changes in the current received by said utilization circuit cause corresponding changes in the currents traversing said secondary winding and said primary winding whereupon said (c) means develops and applies to said input a negative feedback voltage tending to oppose said changes.

2. The combination according to claim 1 wherein said (c) means includes impedance means through which said output current flows and also includes capacitive means connected between said impedance means and said input for applying said negative feedback to the latter.

3. In combination: first A.C. amplifying means to which an input signal is to be applied, second A.C. amplifying means for amplifying the signal in the output of said first amplifying means, a transformer whose primary is coupled to the output of said second amplifying means, means coupled to said primary and to said first amplifying means for feeding back to the input circuit of said first amplifying means a signal tending to oppose the conduction of said first means, demodulating means coupled to the secondary of said transformer and to a source of a signal having the same frequency as said input signal and a fixed reference phase with respect thereto for demodulating said amplified signal appearing in the output of said second amplifying means, said secondary also being connected to output terminals adapted to be coupled to a utilization circuit, the current in said utilization circuit which passes through said secondary of said transformer producing in said primary a signal whose amplitude is responsive to the current in the utilization circuit, said feedback signal having an amplitude responsive to the amplitude of said signal produced in said primary, said feedback signal thereby assisting in maintaining the current in said utilization circuit substantally independent of changes in the impedance of said utilizaton circuit and proportional to said input signal.

4. In combination: first solid-state A.C. amplifying means to which an input signal is to be applied, second solid-state A.C. amplifying means to which the output of said first amplifying means is applied, a transformer whose primary is in series with the output of said second amplifying means, adjustable resistance means in series with said primary, capacitive means in series with said resistance means and coupled to said first amplifying means, said resistance and said capacitive means providing a negative feedback path for A.C. to said first amplifying means, demodulating means to which is applied a signal of the same frequency as said input signal but having a fixed reference phase with respect thereto, said demodulating means being coupled to the secondary of said transformer, and output terminals coupled to said secondary and to said modulating means and being adapted to be connected to a utilization circuit, the current in said utilization circuit which traverses the secondary, said transformer producing in its primary a signal which is applied via said feedback path to said first amplifying means, said feedback signal having the opposite polarity as said input signal and having an amplitude responsive to the amplitude of current in said secondary as affected by changes in the current in said utilization circuit, said feedback signal thereby assisting in maintaining the current in said utilization circuit substantially independent of changes in the impedance of said utilization circuit and proportional to said input signal.

5. The combination according to claim 4 wherein said first solid-state amplifying means comprises a transistor to whose base said input signal is applied, wherein said signal applied via said feedback means is applied to the emitter of said first solid-state amplifying means, and wherein said adjustable resistance means determines the amplitude of said feedback signal thereby to adjust the overall gain of said first and second amplifying means.

6. The combination according to claim 4 wherein said input signal is derived from the output of a differential transformer and wherein means are provided for applying to said first amplifying means said reference phase signal for permitting the effective "null point" of the differential transformer to be modified.

7. The combination according to claim 4 wherein said demodulating means comprises a second transformer coupled to receive said reference phase signal, said second transformer having two separate secondary windings, first and second pairs of transistors, the transistors of each pair having their bases and collectors coupled to one another, one emitter of each pair being coupled to an emitter of the other, another emitter of each pair being coupled together through the secondary of said first transformer, said separate secondary windings being respectively connected between the common collectors and bases of each pair, said windings being arranged to apply respectively opposite signals to the bases of the two pairs one of which causes one pair to conduct while the other is rendered nonconductive, and wherein said output terminals are coupled to said common connection of one emitter of each pair and the mid-point of said secondary of said first transformer.

8. The combination according to claim 7 with the addition of a phase-adjustment network between the primary of said second transformer and the source of said reference phase signal.

References Cited by the Examiner

UNITED STATES PATENTS

| | | | |
|---|---|---|---|
| 1,949,848 | 3/34 | Tillyer | 329—178 |
| 2,937,342 | 5/60 | Wellman | 329—103 |
| 3,088,076 | 4/63 | Burwen | 330—10 X |

ROY LAKE, *Primary Examiner.*

ARTHUR GAUSS, NATHAN KAUFMAN, *Examiners.*